United States Patent Office 3,725,265
Patented Apr. 3, 1973

3,725,265
PURIFICATION OF WASTE WATER
Casimer C. Legal, Jr., Elkridge, Md., assignor to
W. R. Grace & Co., New York, N.Y.
Continuation-in-part of application Ser. No. 61,530,
Aug. 6, 1970. This application Jan. 22, 1971, Ser.
No. 108,907
Int. Cl. C02b 1/20; C02c 5/02
U.S. Cl. 210—45                               24 Claims

ABSTRACT OF THE DISCLOSURE

A multi-stage liming process is described which purifies waste water by controlling the pH of the waste water, e.g., as from a phosphate fertilizer plant, and thereby permitting selective precipitation of impurities in the waste water and their recovery as useful by-products of the process. In one embodiment of the invention the main product of the first stage is a low silica calcium fluoride, and the main product of the second stage is a low fluorine dicalcium phosphate. In another embodiment of the invention the main product of the first stage is low in phosphate content thereby enhancing the value of the by-product, low silica calcium fluoride.

---

This application is a continuation-in-part of U.S. Ser. No. 61,530, filed Aug. 6, 1970, assigned to the same assignee, now abandoned.

OBJECTIVES OF THE INVENTION

An objective of the present invention is the development of a process for the purification of waste water having a low pH and containing dissolved phosphate and fluoride contaminants, and silica, which comprises a multistep liming process. It is a further objective of this invention to provide a process for the recovery of the by-products of the purification process for further use. It is further an objective of this invention to provide a process for producing hydrofluoric acid which is relatively free of impurities and a process for producing $P_2O_5$-containing products. It is an additional objective to provide a process for removing fluorine and silica from waste water separately. It is a further objective to raise the pH of the pond water so that it can safely be released to natural watersheds.

Further objectives will become apparent to those skilled in the art as the description proceeds.

In the figures:

FIG. 1 depicts the advantages of using a two-stage liming process as compared to a one-stage process in order to remove the fluorine from waste water. FIGS. 2–3 illustrate the various pH's at which the various components of phosphate fertilizer plant waste water are precipitated when lime is added to the waste water in a controlled manner. FIG. 2 is more particularly, a more exact representation than FIG. 3, of the effect of a two-stage liming process on one contaminant, fluorine, as compared to the single-stage process. FIG. 3 illustrates, in particular, that most of the silica is retained in the waste water, thus contaminating neither the fluoride nor phosphate by-products.

BACKGROUND

Figure 1:
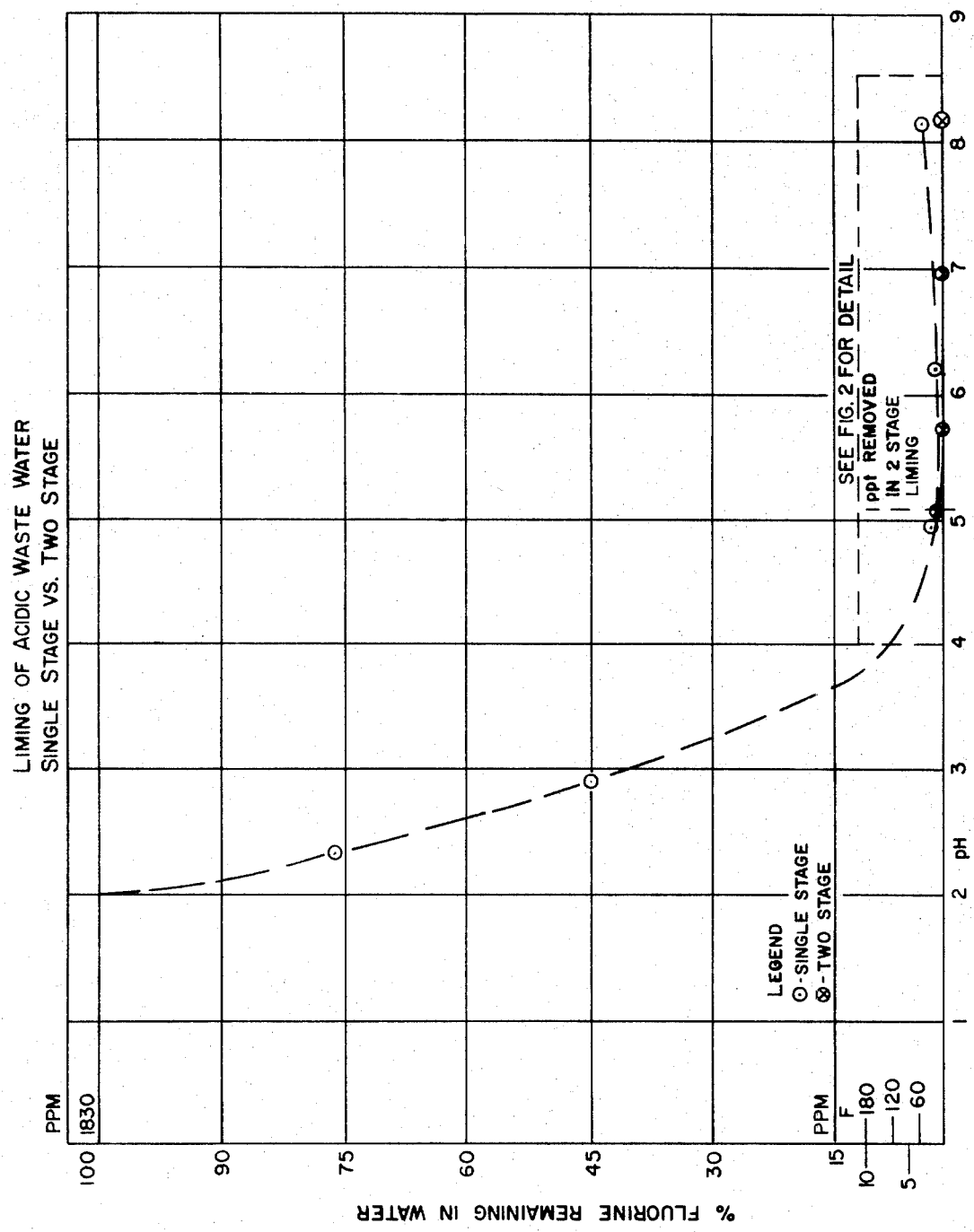

In the treatment of industrial sewage one of the principal problems is the removal of various contaminants. In particular, one of the major contaminants of waste water of phosphate fertilizer plants is phosphorus, present generally in phosphate form. Phosphates are of importance to the growth of algae in waters. Unfortunately, waste water quite often contains an excess of phosphates which lead to a thriving algae population which in turn causes unsightly algae blooms and lake eutrophication. Additionally, the waste water that is collected is generally stored in what is referred to as large "ponds." These ponds may occupy up to several acres and in addition to being unsightly, are deadly to marine life due to the excessively acidic condition of the pond water.

However, the phosphates which exist in the waste water, particularly in such waters where fertilizer plants are present, are an as yet untapped source of phosphorus compounds which are valuable ingredients in the preparation of fertilizers, animal feeds, and the like.

Another contaminant, fluorine, can also be present in waste water in large quantities, generally as fluoride or fluosilicates, particularly in waste water of phosphate fertilizer plants. Such fluorine compounds are, as is well-known, useful in many ways, i.e., pickling acids for stainless steel, alkylation catalysts to produce high-octane compounds for gasoline, in the manufacture of aluminum, etching glass, preventing tooth decay, etc. These waste waters are therefore, also an untapped source of fluorine compounds.

Silica is present in waste waters from fertilizer plants as a result of being present in most phosphate rocks. And, although not present in quantities large enough to be economically beneficial when extracted from the waste water, in addition to being a pollutant, it is highly undesirable in a source of HF, since treatment of a fluoride which contains silica yields hydrofluosilicic acid ($H_2SiF_6$) instead of hydrofluoric acid (HF). Hydrofluoric acid is customarily produced in commercial amounts by the treatment of the mineral fluorspar, which is substantially $CaF_2$, with concentrated sulfuric acid. One of the prime specifications of fluorspar is the percent of contained silica. According to I. G. Ryss, in The Chemistry of Fluorine and Its Inorganic Compounds: "To prevent contamination of the evolved HF with silicon tetrafluoride which forms fluosilicic acid ($H_2SiF_6$) when the gas is absorbed by water, fluorspar having as small a silica content as possible is normally used." In general, the usefulness, and therefore the economic value of the hydrogen fluoride is much greater than that of the hydrofluosilicic acid and thus the hydrogen fluoride is much more desirable than the hydrofluosilicic acid. Of course, to obtain the hydrogen fluoride it is preferable to leave the silica in the waste water so that it does not contaminate the hydrogen fluoride. Until now, however, it has not been known how to accomplish this goal.

Of course, it is also preferable that in addition to a minimum amount of silica being present in the hydrogen fluoride source, there be a minimum amount of $P_2O_5$ present in the HF source to insure a purified hydrogen fluoride.

As is well-known in the art, lime is widely used in treating polluted water which is strongly acidic (pH=1–2) (U.S. Pat. 3,345,288). Additionally, lime has been used in the past to aid in removing fluorine from polluted water (U.S. Pat. 2,126,793).

Figure 2:
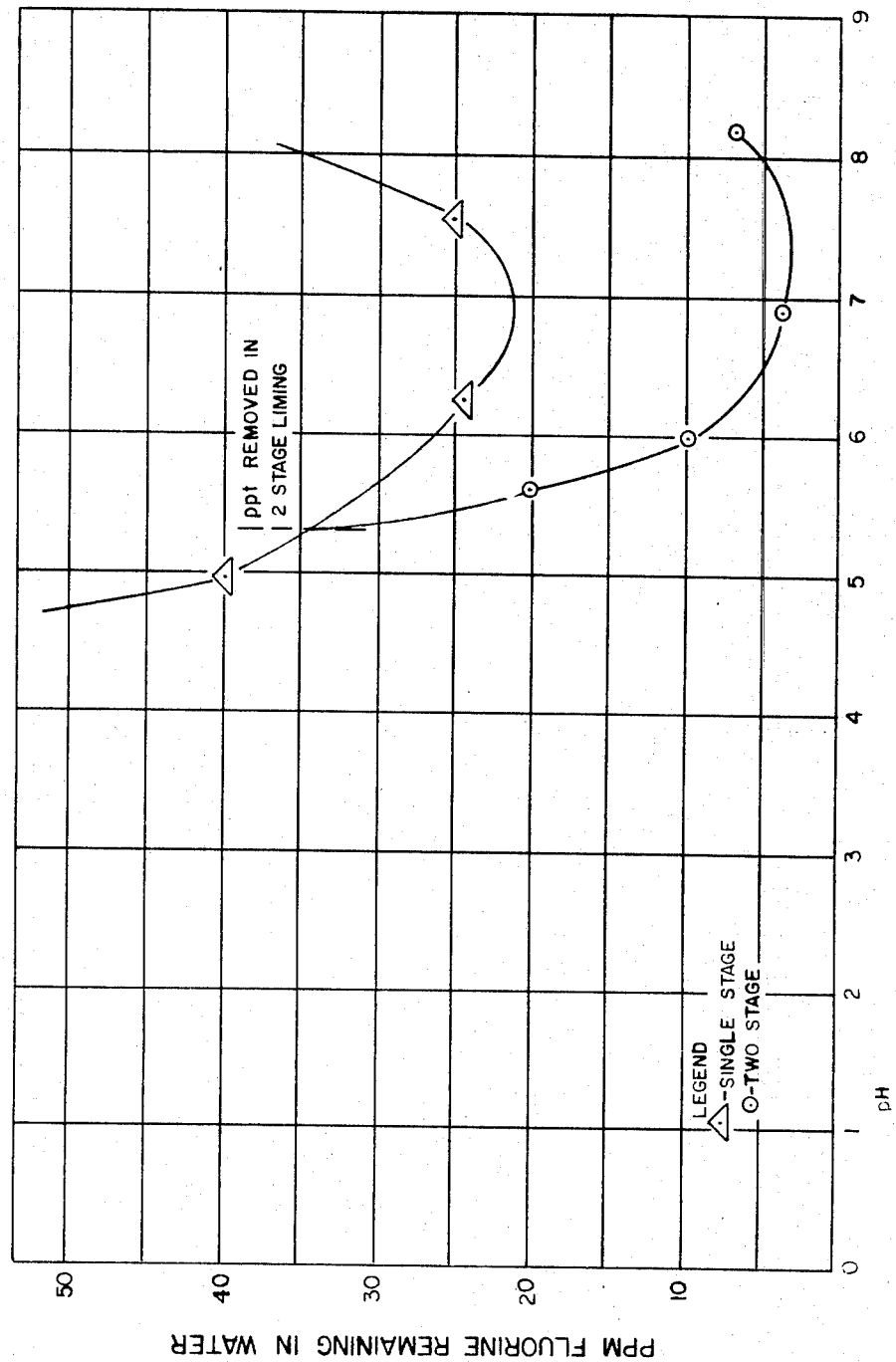

Thus, although it is well-known to use lime to aid in purifying water, a multi-stage liming process (i.e., two or more lime treatments) with resultant recovery of the by-products of the liming as valuable chemical entities, is novel. I have also found that such process is critical in removing the maximum amount of fluorine from the water. I have found that when a single-stage liming process is used at a high pH, the resulting precipitate of calcium fluoride tends to redissolve in water (FIGS. 1 and 2). However, with a multi-stage liming process with removal of the resulting precipitae after each liming stage, and with the first liming kept on the acid side (pH of the waste water), essentially all of the fluorine can be removed after the first liming (FIG. 1).

I have further found that essentially all of the fluoride ion can be precipitated substantially free of silica at a pH of about 5. The emphasis I place upon the necessity of controlling the pH of the polluted water in order to recover valuable by-products of the purification process while employing my multi-stage liming process has not heretofore been known in the art.

I have also found that when the fluoride ion is precipitated at an even lower pH (e.g. 3.5), the precipitate contains less $P_2O_5$ than when the precipitate is collected after the pH attains 5.0. Further treatment of ihis precipitate with the polluted (i.e. raw pond) water reduces the $P_2O_5$ content in the precipitate even more. An additional water wash (hot or cold) then removes the polluted $P_2O_5$-containing polluted water which can then be subjected to further purification by the process of this invention. Besides treating the precipitate with the raw pond water (hot or cold), the precipitate can be treated with various combinations of raw pond water, hot or cold tap water, and weak $H_2SiF_6$ solutions (0.5–1.0% by weight reagent grade).

The waste waters suitable for treatment by the process of this invention in general contain objectionably high levels of fluoride and phosphate ions. This invention reduces the fluoride and phosphate content to generally acceptable levels. For example, regulations of the State of Florida require waste water discharged to Florida streams and rivers contain not more than 10 p.p.m. fluorine (i.e., fluoride ion). The processes of this invention easily meet fluorine and phosphate pollution maximum and also greatly reduces the sulfate ion content and lowers the silica content of the waste water.

Waste waters having a pH of about 1–3 containing the following contaminants are thus particularly suitable for treatment by this invention.

|  | P.p.m. |
|---|---|
| Fluoride ions (as F) | 1500–5000 |
| Phosphate ions (as $P_2O_5$) | 2000–7000 |
| Sulfate ions | 2000–5000 |
| Silica ($SiO_2$) | 600–900 |

The process of this invention prevents the silica in the waste water from contaminating the hydrogen fluoride which can be obtained after the first liming stage by separating the calcium fluoride from the waste water before the silica is removed. This also has the effect of removing the fluorine so that low fluorine calcium phosphate can later be removed from the waste water.

GENERAL DESCRIPTION

In one embodiment of this invention lime is added in a multi-stage process to waste water, more particularly waste water containing phosphorus and fluorine pollution and silica, such as may be found in the waste water of fertilizer plants. The pH of waste water which is the result of fertilizer plants is generally quite acidic and it typically is 1–3. Lime is added directly to the waste water until the pH is about 5. As soon as the liming process begins, fluorine, mainly as calcium fluoride, begins to precipitate. When the pH reaches about 5–5.3, the liming is stopped and the precipitate which has been formed is separated by any convenient separation procedure. After the separation, the filtrate is again treated with lime until a pH of about 6.5–8.5 is attained. This second liming step causes a second precipitate to form which is rich in $P_2O_5$ in the form of available or citrate soluble calcium phosphates.

The second precipitate, hereafter referred to as calcium phosphates, contains a mixture of phosphates including dicalcium phosphate and tricalcium phosphate. The ratio of fluorine to phosphorus in this second precipitate is generally in the range of 1:15–45. This is quite similar to Curacao rock which is a common source of fertilizer grade phosphate and is also used directly as a source of phosphate for chicken feed supplements.

In another embodiment of this invention lime is added in the multi-stage process to the waste water, more particularly waste water containing phosphorus and fluorine pollution and silica, such as may be found in the waste water of fertilizer plants. However, the first stage liming is stopped when the pH of the water reaches 5.0, preferably when the pH is in the range of 3.5–4.5, and more preferably at 3.5. (As can be seen from FIG. 3, at a pH of 3.5 about 21% of the fluorine remains in the waste water, about 90% of the $P_2O_5$ still remains, and all the silica is still in the waste water. Obviously, this means that there is less $P_2O_5$ contaminant in the first stage precipitate when the precipitate is removed at a pH of 3.5 rather than at a pH of 5.0.) When the waste water reaches the pH of 3.5–5.0, the precipitate which is formed is separated from the waste water by any convenient separation procedure. After the separation the filtrate is again treated with lime until a pH of about 6.5–8.5 is attained. This second liming step causes a second precipitate to form which is rich in $P_2O_5$ in the form of available or citrate soluble calcium phosphates. Of course an intermediate step is also possible if the original precipitate is removed when the pH of the waste water is 3.5. Since less fluorine has precipitated when the pH is 3.5. than when it is 5.0, there is more fluorine present to contaminate the by-product, $P_2O_5$. Thus removal of all precipitate at about 5.0 will leave a substantially fluorine-free waste water from which $P_2O_5$ can be extracted.

DETAILED DESCRIPTION

When using lime in a multi-stage treatment process to purify water and thereby recover by-products of the purification, it is of paramount importance to control the pH during liming of the solution being purified.

Some waste waters, particularly those associated with the fertilizer industry, have exceedingly acidic qualities, i.e., a pH of 1–3. It has now been found that by selectively controlling the neutralization process, valuable by-products can be obtained while the waste water is being purified.

Specifically, the addition of lime causes a precipitate to form and upon analysis it is found that the initial precipitate contains both fluorides and $P_2O_5$. The precipitate appears to be a mixture of calcium fluoride, calcium sulfate, and calcium phosphates, hydrates of aluminum and iron phosphates and trace amounts of silica (not more than 0.1% $SiO_2$). Further tests have shown that well over 90% of the fluorine is precipitated by the time the pH reaches 5.0 (about 79% of the fluorine is precipitated by the time the pH reaches 3.5) and that only trace amounts of fluorine remain in the waste water by the time the pH reaches 5.25. At this pH, nearly 100% of the silica remains in the waste water and therefore, does not contaminate the fluoride product, calcium fluoride (see FIG. 3).

Thus, by stopping the addition of the lime when the pH reaches about 5, it is possible to separate the fluorine from other pollutants remaining at this point, including any remaining $P_2O_5$ values. Following filtration and washing the first precipitate can be treated with sulfuric acid to make hydrogen fluoride as is well-known, in the following manner: $CaF_2 + H_2SO_4 \rightarrow CaSO_4 + 2HF$. The hydrogen fluoride which is formed contains some $P_2O_5$ values since only about 75% of the $P_2O_5$ values present in the first precipitate are removed by washing. Of the $P_2O_5$ that remains behind, a portion will also be present as HF contaminants, but can be removed by various means such as fractional distillation.

Figure 5:
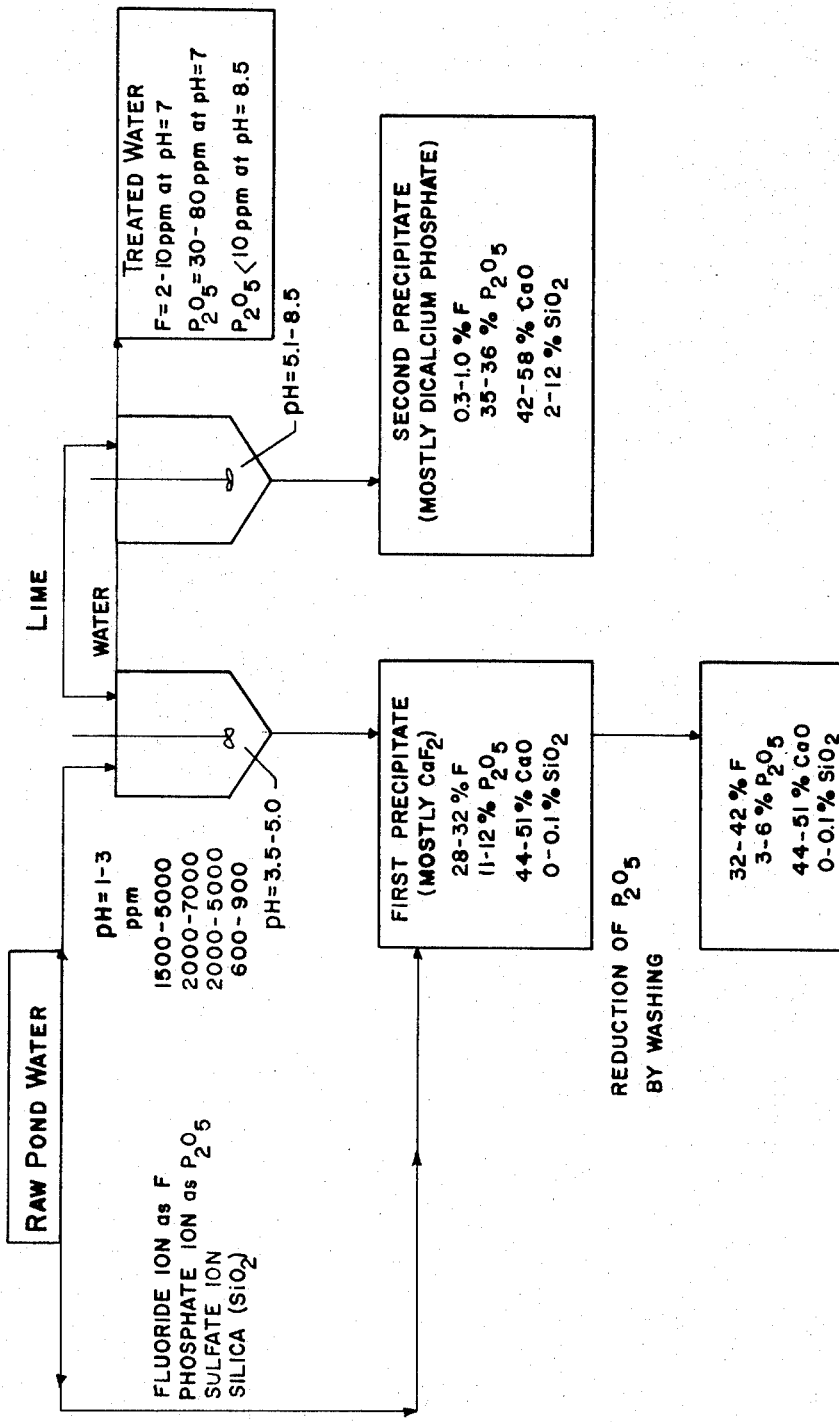
FIG. 5 is a schematic diagram of a particular embodiment of this invention wherein the $P_2O_5$ included in the by-product of the first stage of liming is substantially reduced to thereby provide a low silica calcium fluoride with a low phosphate content.

If the addition of the lime is stopped prior to a pH of 5, there will be less $P_2O_5$ in the precipitate. The precipitate which is formed can then be washed with the waste water, tap water, reagent grade 0.5–1.0% by weight $H_2SiF_6$, or combinations thereof. When this is done the amount of $P_2O_5$ remaining in the precipitate is rduced as much as 75%. A further washing with hot or cold water is recommended to then remove the occluded waste water. For purposes of the specifications and claims the term "hot water" refers to water which has a temperature above 80° C. Following this treatment the final precipitate can be treated with sulfuric acid to make substantially pure hydrogen fluoride as shown heretofore. This embodiment is further shown in FIG. 5.

In addition to the fluorine which is precipitated there is also a trace amount of silica present with the precipitate. However, the small amounts present are not sufficient to substantially lower the quality of the hydrogen fluoride. The silicon which is released when sulfuric acid is added to the precipitate is in the form of $H_2SiF_6$, hydrofluosilicic acid. Generally, the mixture of hydrogen fluoride and hydrofluosilicic acid is at least 90% hydrogen fluoride (and 98% or more when the precipitate is removed when the pH reaches 3.5 as explained heretofore). The second precipitate, as shown in FIG. 3, begins to form in significant amounts when the pH is about 5.5.

Figure 3:
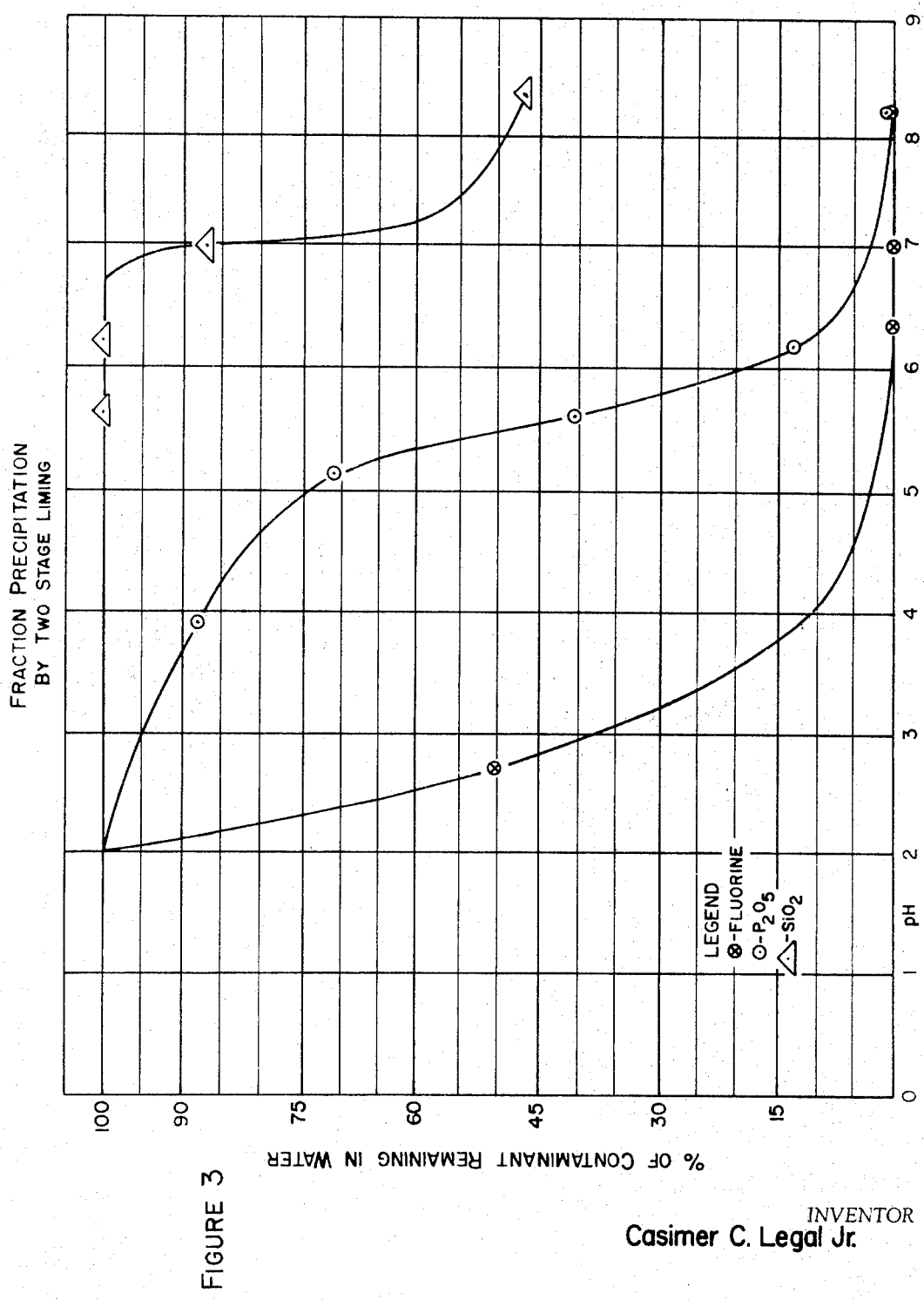
Figure 4:
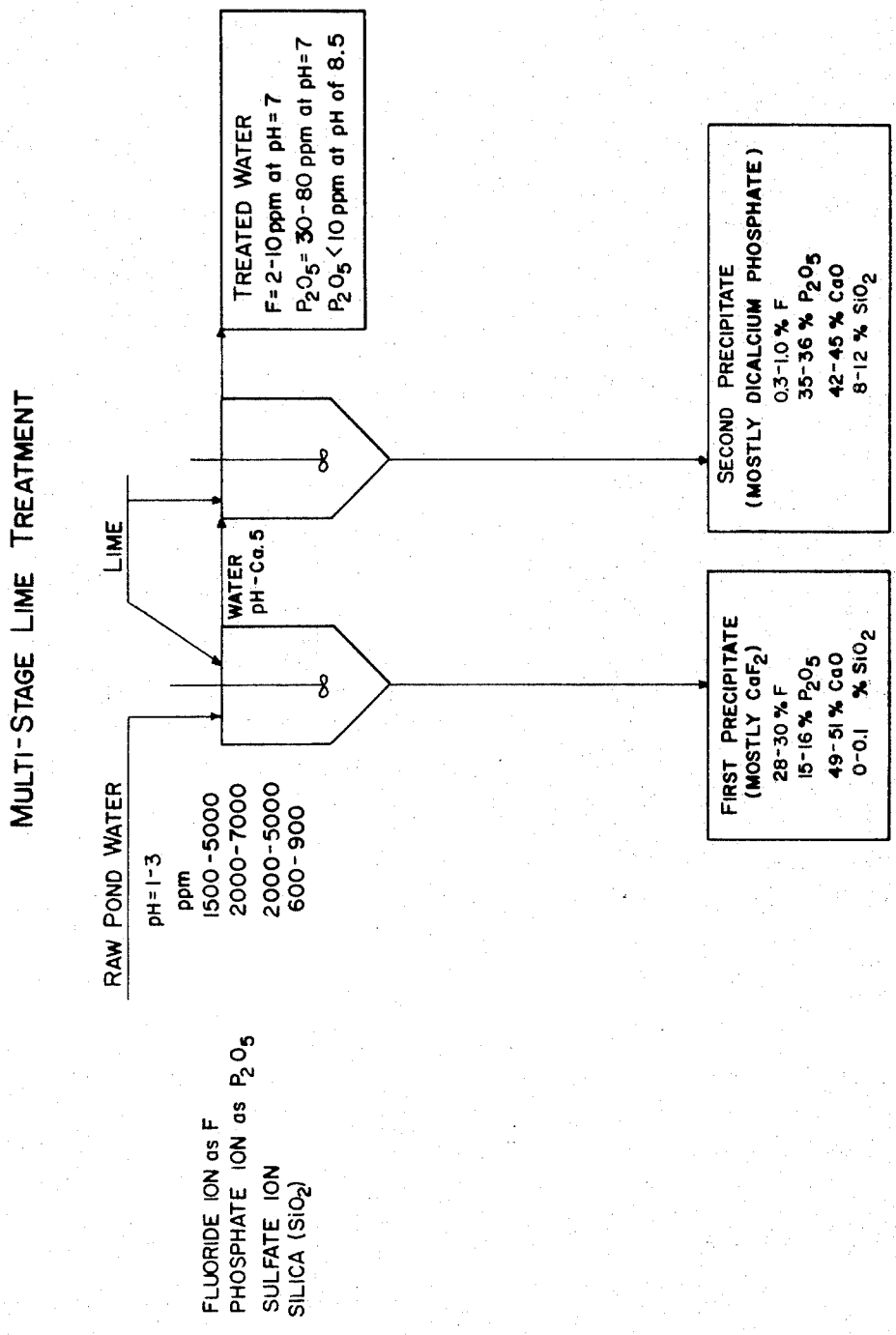
FIG. 4 is a schematic diagram of the multi-stage lime treatment process of this invention.

As FIG. 3 shows, a large percentage (85) of the original phosphate content is precipitated when a pH of about 6.5 is reached, and virtually all of the $P_2O_5$ is precipitated as calcium phosphates when a pH of about 8.5 is attained (less than about 10 p.p.m. phosphate as $P_2O_5$ remains in the pond water). As FIG. 3 shows, at a pH of about 6.5 substantially all the silica (i.e., about 99.9%) still remains in the waste water. Hence a phosphate-silica separation has been effected. The precipitate, mostly dicalcium phosphate, will, when formed at a pH of about 6.5 or higher, contain some fluorine. This product is acceptable as an animal feed supplement.

The recovered dicalcium phosphates have also been found to be easily soluble in citric acid, another primary requirement for a fertilizer. It has been found that the $P_2O_5$ content of this precipitate is in the range of 25–40%, so that it is quite satisfactory for use as a fertilizer, and in chicken feed supplements.

Additional liming, i.e., a third addition, is optional and results in a calcium phosphate precipitate being formed which contains still less fluorine. The F:P ratio of this precipitate is generally quite close to 1:100 and the product is acceptable as an animal feed product. If the 1:100 ratio is not attained, it can be reached by any of several methods such as mixing with additional "pure" dicalcium phosphate. It can then be used as such for short lived animals, e.g., chickens, or it can be used to make a high grade wet phosphoric acid.

The multi-stage liming has shown that the fluorine content in the water is significantly reduced as compared to the single-stage process of the prior art, i.e., some of the calcium fluoride initially precipitated in the single stage process tends to redissoovle in the waste water at a high pH thus decreasing the value of the lime treatment by decreasing the amount of fluorine actually removed from the waste water (FIG. 2).

The above procedure successfully removes fluoride and $P_2O_5$ to the extent that when the pH is approximately 6.5–7.0 upon analysis it is found that the now purified waste water contains about 2–10 p.p.m. of fluorine and approximately 30–80 p.p.m. of $P_2O_5$. The latter can be further reduced if desired by increasing the pH to higher levels with additional lime, e.g., at a pH of 8.5 $P_2O_5$ is reduced to 10 p.p.m. Both of these impurities are now reduced to a level which allows the water to now be called "purified" as regards fluorine and $P_2O_5$.

Further treatment of the first-stage precipitate enables hydrogen fluoride to be attained which is substantially pure in that the $P_2O_5$ which was originally present in the first-stage precipitate is removed from the precipitate and the HF product by the further treatments as explained heretofore.

The following examples illustrate without limiting the invention.

Example 1

132.1 grams of an approximately 5% CaO solution prepared by suspending and dissolving 47 grams CaO in 953 grams of deionized water (providing in effect, a solution and/or suspension of calcium hydroxide) were added to 2000 grams of waste water having a pH of 2.0, and the analysis given at the end of the example. The solution was stirred for 30 minutes, after which time the pH had risen to 5.0 and a precipitate had formed. The precipitate was collected and found to weigh 58.6 grams when wet and 13.2 grams when dry. The weight of the filtrate was 2063 grams. An analysis performed on both the solid and filtrate gave the following results.

| First stage liming | Percentage of— | | | |
|---|---|---|---|---|
| | $P_2O_5$ | F | CaO | $SiO_2$ |
| Solid | 15.13 | 28.15 | 49.01 | 0.04 |
| Filtrate | 0.1584 | 0.0047 | 0.1302 | 0.0954 |

Based upon the percentages in the analyses given immediately above, it can be calculated that the composition of the first precipitate (solid) is approximately as follows: 57.7% $CaF_2$, with most of the remainder being dicalcium phosphate, along with minor amounts of $CaSO_4$ and phosphates of iron and alumina, and a trace of silica. This is also the approximate qualitative composition of the first precipitate in each of the following examples.

24.3 grams of the approximate 5% CaO solution was then added to 1000 grams of the filtrate to form the second precipitate. After stirring for 30 minutes the pH had risen to 7.10. After filtration the weight of the filtrate was 987 grams. The weight of the wet precipitate was 27.9 grams and after drying the precipitate weighed 4.63 grams. An analysis of the filtrate and precipitate and the analysis of the original waste water are given below:

| Second stage liming | Percentage of— | | | |
|---|---|---|---|---|
| | $P_2O_5$ | F | CaO | $SiO_2$ |
| Solids | 35.00 | 0.98 | 42.01 | 11.10 |
| Filtrate (pH 7.1) | 0.0046 | 0.0003 | 0.0504 | 0.0444 |
| Untreated waste water | 0.2810 | 0.1830 | 0.1358 | 0.0725 |

Example 2

198.6 grams of a 5% CaO solution prepared as in Example 1 were added to 2000 grams of waste water having a pH of 1.95 and the analysis given at the bottom of the example. The solution was stirred for 35 minutes, after which time the pH had risen to 5.1 and a precipitate had formed. The precipitate was collected and found to weigh 80.15 grams when wet and 20.0 grams when dry. The weight of the filtrate was 2108.3 grams. An analysis performed on both the solid and filtrate gave the following results.

| First stage liming | Percentage of— | | | |
|---|---|---|---|---|
| | $P_2O_5$ | F | CaO | $SiO_2$ |
| Solid | 17.23 | 23.65 | 48.82 | 0.05 |
| Filtrate | 0.2051 | 0.0027 | 0.1282 | 0.0950 |

31.9 grams of the 5% CaO solution was then added to 1000 grams of the filtrate. After stirring for 30 minutes the pH had risen to 7.05. After filtration the weight of the filtrate was 997.8 grams. The weight of the wet precipitate was 29.20 grams, and after drying the precipitate weighed 5.85 grams. An analysis of the filtrate and precipitate is given below:

| Second stage liming | Percentage of— | | | |
|---|---|---|---|---|
| | $P_2O_5$ | F | CaO | $SiO_2$ |
| Solid | 31.73 | 0.68 | 38.92 | 10.92 |
| Filtrate | 0.0076 | 0.0005 | 0.0448 | 0.0454 |
| Untreated waste water | 0.3970 | 0.2440 | 0.151 | 0.0770 |

Example 3

143.9 grams of a 5% CaO solution prepared as in Example 1 were added to 2000 grams of waste water having a pH of 2.0 and the analysis given at the end of this example. The solution was stirred for 35 minutes, after which time the pH had risen to 5.15 and a precipitate had formed. The precipitate was collected and found to weigh 61.55 grams when wet and 14.85 grams when dry. The weight of the filtrate was 2072.1 grams. An analysis performed on both the solid and filtrate gave the following results:

| First stage liming | Percentage of— | | | |
|---|---|---|---|---|
| | $P_2O_5$ | F | CaO | $SiO_2$ |
| Solid | 17.97 | 22.15 | 47.00 | 0.07 |
| Filtrate | 0.1354 | 0.0043 | 0.1172 | 0.0943 |

21.25 grams of the 5% CaO solution was then added to 1000 grams of the filtrate. After stirring for 30 minutes the pH had risen to 7.1. After filtration the weight of the filtrate was 997.65 grams. The weight of the wet precipitate was 18.00 grams and after drying the precipitate weighed 4.05 grams. An analysis of the filtrate and precipitate and the analysis of the original waste water are given below:

| Second stage liming | Percentage of— | | | |
|---|---|---|---|---|
| | $P_2O_5$ | F | CaO | SiO |
| Solid | 33.61 | 1.05 | 40.08 | 10.65 |
| Filtrate | 0.0061 | 0.0010 | 0.0574 | 0.0420 |
| Untreated waste water | 0.2810 | 0.1830 | 0.1358 | 0.0725 |

The following Examples 4–8, illustrate the embodiment of this invention wherein it is desired to minimize the amount of $P_2O_5$ present in the first precipitate.

Example 4

372.0 grams of an approximately 5% CaO solution prepared by suspending and dissolving 47 grams CaO in 953 grams of deionized water (providing in effect, a solution and/or suspension of calcium hydroxide) were added to 3750 grams of waste water having a pH of 1.90 and the analysis given at the end of the example. After 25 minutes the pH of the mixture had risen to 3.50 and a precipitate had formed. The precipitate was recovered and found to weigh 142.95 grams when wet. 2250 grams of the raw pond water was then added to the wet solid, heated to a boil, and stirred for 15 minutes. Filtering was again used to obtain a second precipitate which weighed 125.02 grams when wet. 100.02 grams of this wet precipitate was dried in an oven at 105° C. and 34.96 grams of dry solids with the following analysis was recovered:

| | Percentage of— | | | |
|---|---|---|---|---|
| | $P_2O_5$ | F | $SiO_2$ | CaO |
| Dry solids | 6.80 | 36.00 | 0.44 | 42.00 |
| Raw pond water | 0.4168 | 0.3370 | 0.0967 | 0.0510 |

To 2000 grams of the first stage filtrate was added 69.77 grams of the 5% CaO solution prepared heretofore. After mixing 15 minutes the pH had risen to 7.0 and a precipitate had formed. No. 1 filter paper was then used to recover the 98.38 grams of wet precipitate by filtration. The wet precipitate was then dried in an oven at 105° C. and 15.30 grams of dry solids were recovered. The dry solids and filtrate had the following analysis:

| | Percentage of— | | | |
|---|---|---|---|---|
| | $P_2O_5$ | F | CaO | $SiO_2$ |
| Dry solids | 34.30 | 0.56 | 38.68 | 2.70 |
| Filtrate | 0.0116 | 0.0003 | 0.0250 | 0.0960 |

Example 5

20 grams of the dried solids of the first stage liming of Example 4 were then treated with hot tap water as follows:

(a) slurried with 1000 ml. hot tap water and filtered (the filtrate had a pH=3.0);
(b) the precipitate from (a) was then washed in a Büchner funnel with 1000 ml. hot tap water and again filtered (the filtrate had a pH of 3.5);
(c) the washed precipitate from (b) was slurried with 1000 ml. hot tap water and filtered (the filtrate had a pH of 3.5);
(d) the precipitate from (c) was slurried in 1000 ml. hot tap water and filtered slightly raising the pH of the filtrate;
(e) the precipitate from (d) was then slurried with 1000 ml. hot tap water twice and filtered after each slurrying (the filtrate's pH was then 5.9);
(f) the precipitate from (e) was then washed twice in a Büchner funnel with 500 ml. of hot tap water and filtered after each washing (the pH of the filtrate was then 6.7);
(g) the wet precipitate was dried in an oven at 105° C. 16 grams of dried solids having the following analysis were recovered:

| | Percentage of— | | | |
|---|---|---|---|---|
| | $P_2O_5$ | F | $SiO_2$ | CaO |
| Dried solids | 5.10 | 38.95 | Nil | 56.7 |

Example 6

To 4000 grams of raw pond water (with the analysis given below) having a pH of 2.15 was added 201.63 grams of a 5% CaO solution thereby raising the pH to 3.5 after 95 minutes of mixing. After filtering 83.09 grams of wet solids were recovered. 1050 grams of hot raw pond water (having the same analysis as the 4000 grams) was added to the wet solids. The mixture was heated to and maintained at boil for 15 minutes. The mixture was again filtered and 69.73 grams of wet solids were recovered and washed with 1200 grams of hot tap water 9 times until the pH of the washings had risen to 6.10. 56.10 grams of wet solids were recovered after the last washing and dried at 105° C. in an oven. 17.83 grams of dry solids having the following analysis was recovered.

| | Percentage of— | | | |
|---|---|---|---|---|
| | $P_2O_5$ | F | $SiO_2$ | CaO |
| Dried solids | 6.35 | 39.00 | Nil | 52.0 |
| Raw pond water | 0.3178 | 0.1805 | 0.0698 | 0.1162 |

Example 7

To 8000 grams of raw pond water (see analysis at end of example) having a pH of 2.2 was added 391.75 grams of a 5% CaO solution thereby raising the pH to 3.55 after 60 minutes of mixing. After filtering 153 grams of wet solids were recovered. To 40 grams of these wet solids was added 500 grams of a 0.5% by weight $H_2SiF_2$ solution (reagent grade $H_2SiF_6$ and tap water). The mixture was heated to boiling and stirred for 15 minutes. The mixture was then filtered and 28.50 grams of wet solids were recovered. (The pH of the filtrate was 1.7.) The wet solids were washed with boiling tap water five times, thereby gradually raising the pH of each successive filtrate to 6.30. The wet solids were then dried in an oven at 105° C. and 8.99 grams of dried solids with the following analysis were recovered:

| | Percentage of— | | | |
|---|---|---|---|---|
| | $P_2O_5$ | F | $SiO_2$ | CaO |
| Dried solids | 3.70 | 39.76 | Nil | 55.20 |
| Raw pond water | 0.3178 | 0.1805 | 0.0698 | 0.1162 |

Example 8

To 25 grams of the wet solids leached with raw pond water (see analysis at end of example) in Example 4 were added 440 grams of hot raw pond water containing 1% by weight $H_2SiF_6$. The mixture was heated to a boil and stirred for 15 minutes. The mixture was filtered and 23 grams of wet solids were recovered. The pH of the filtrate was 1.2. The wet solids were returned to a beaker and another 440 grams of the hot raw pond water containing 1% by weight $H_2SiF_6$ was added to the beaker. The mixture was heated to a boil, stirred for 15 minutes and filtered. 15.95 grams of wet solids were recovered (pH of filtrate=0.95) and dried in an oven at 105° C. 6.15 grams of dry solids with the following analysis was recovered.

| | Percentage of— | | | |
|---|---|---|---|---|
| | $P_2O_5$ | F | CaO | $SiO_2$ |
| Dry solids | 3.85 | 40.8 | 41.65 | 0.04 |
| Raw pond water | 0.4168 | 0.3370 | 0.1280 | 0.0967 |

What is claimed:

1. A process for purifying an acidic waste water having a pH of about 1–3 and containing fluoride, phosphate, calcium, and sulfate ions, and silica comprising the following steps:
   (a) adding sufficient $Ca(OH)_2$ solution to said waste water to increase the pH thereof to about 5, whereby there is formed a first precipitate substantially free of silica and containing calcium fluoride as a major component;
   (b) separating and recovering said first precipitate from said residual waste water thereby leaving a first filtrate;
   (c) adding sufficient $Ca(OH)_2$ solution to said first filtrate to bring the pH of said first filtrate within the range of about 6.5–8.5 whereby there is formed a second precipitate containing calcium phosphates as a major component; and
   (d) separating and recovering said second precipitate, thereby leaving a purified water containing about 2–10 p.p.m. fluoride ions and about 30–80 p.p.m. phosphate ions.

2. A process according to claim 1 in which the pH in step (c) is about 6.5.

3. The process according to claim 1 in which the ratio of fluorine to phosphorus as $P_2O_5$ in said second precipitate is about 1:30.

4. The process according to claim 1 wherein the waste water treated contains the following impurities in parts per million: 1500–5000 fluoride, 2000–7000 phosphate as $P_2O_5$, 2000–5000 sulfate ions, and 600–900 silica.

5. A process according to claim 1 comprising adding sufficient calcium oxide solution to waste water having an initial pH of about 1–2, to increse the pH to about 5, stirring the solution, whereby a precipitate is formed comprising mostly calcium fluoride and not more than about 0.1 percent silica, recovering the precipitate, thereby leaving an aqueous residue; treating the residue with sufficient calcium oxide solution with stirring until the pH reaches about 7 thereby to form a second precipitate comprising mostly calcium phosphates; separating and recovering the thus formed second precipitate from the resulting aqueous residue, thereby to provide a purified aqueous residue containing about 30–80 p.p.m. phosphate as $P_2O_5$, and about 2–10 p.p.m. fluoride.

6. A process according to claim 5 in which about 66 parts by weight of a 5% calcium oxide solution is added to about 1000 parts by weight of waste water having a pH of about 2, stirring the solution, whereby the pH rises to about 5 and a precipitate comprising mostly calcium fluoride and not more than 0.1% silica is formed, recovering the precipitate, thereby leaving an aqueous residue, treating the said aqueous residue with about 24 parts by weight of a 5% calcium oxide solution per 1000 parts of said aqueous residue with stirring, until the pH reaches about 7 to form a second precipitate comprising mostly calcium phosphates; separating and recovering the thus formed second precipitate from the resulting aqueous residue, thereby to provide a purified final aqueous residue containing about 46 p.p.m. phosphate as $P_2O_5$ and about 3 p.p.m. fluoride; the initial analysis of the said starting waste water in weight percent being about 0.28 phosphate as $P_2O_5$, 0.18 fluoride, 0.14 calcium ions as CaO, and 0.07 silica.

7. A process according to claim 5 in which about 66 parts by weight of a 5% calcium oxide solution is added to about 1000 parts by weight of waste water having a pH of about 2, stirring the solution, whereby the pH rises to about 5 and a precipitate comprising mostly calcium fluoride and not more than 0.1% silica is formed, recovering the precipitate, thereby leaving an aqueous residue, treating the said aqueous residue with a 5% calcium oxide solution with stirring, until the pH reaches about 8.5 to form a second precipitate comprising mostly calcium phosphates; separating and recovering the thus formed second precipitate from the resulting aqueous residue, thereby to provide a purified final aqueous residue containing less than about 10 p.p.m. phosphate as $P_2O_5$ and about 3 p.p.m. fluoride; the initial analysis of the said starting waste water in weight percent being about 0.28 phosphate as $P_2O_5$, 0.18 fluoride, 0.14 calcium ions as CaO, and 0.07 silica.

8. A process for purifying an acidic waste water having a pH of about 1–3 and containing fluoride, phosphate, calcium, and sulfate ions, and silica and recovering a low $P_2O_5$ content precipitate comprising the following steps:
   (a) adding sufficient $Ca(OH)_2$ solution to said waste water to increase the pH thereof to about 5 whereby there is formed a first precipitate substantially free of silica and containing calcium fluoride and calcium phosphates as major components;
   (b) separating and recovering said first precipitate from said waste water thereby leaving a first aqueous residue;
   (c) washing said first precipitate sufficiently with water until said first precipitate contains 3–6% by weight $P_2O_5$;
   (d) adding sufficient $Ca(OH)_2$ solution to said first aqueous residue to bring the pH of said first aqueous residue within the range of about 5.1–8.5 whereby there is formed a second precipitate containing calcium phosphates as a major component; and
   (e) separating and recovering said second precipitate, thereby leaving a purified water.

9. The process according to claim 8 in which the water in step (c) is acidic waste water.

10. The process according to claim 8 in which the water in step (c) contains 0.5–1.0% by weight hydrofluosilic acid.

11. The process according to claim 8 in which the water in step (c) is hot water.

12. The process according to claim 8 in which the pH in step (d) is about 6.5.

13. The process according to claim 8 in which the ratio of fluorine to phosphorus as $P_2O_5$ in said second precipitate is about 1:30.

14. The process according to claim 8 wherein said acidic waste water contains the following impurities in parts per million: 1500–5000 fluoride ions, 2000–7000 phosphate ions as $P_2O_5$, 2000–5000 sulfate ions, and 600–900 silica.

15. The process according to claim 8 wherein the $P_2O_5$ content of said first precipitate is in the range of 3–6% by weight after being washed.

16. A process according to claim 8 in which the waste water has an initial pH of about 1–2; in which the aqueous residue from the first precipitate is treated with sufficient calcium hydroxide solution with stirring until the pH reaches about 7 thereby to form the second precipitate comprising mostly calcium phosphates; separating and recovering the thus formed second precipitate from the resulting aqueous residue, thereby to provide a purified aqueous residue containing about 30–80 p.p.m. phosphate as $P_2O_5$, and about 2–10 p.p.m. fluoride; and washing said first precipitate with water until the $P_2O_5$ content of said first precipitate is in the range of 3–6% by weight.

17. A process according to claim 8 in which the waste water has an initial pH of about 1–2; in which the aqueous residue from the first precipitate is treated with sufficient calcium hydroxide solution with stirring until the pH reaches about 8.5 thereby to form the second precipitate comprising mostly calcium phosphates; separating and recovering the thus formed second precipitate from the resulting aqueous residue, thereby to provide a purified aqueous residue containing less than about 10 p.p.m. phosphate as $P_2O_5$, and about 2–10 p.p.m. fluoride; and washing said first precipitate with water until the $P_2O_5$ content of said first precipitate is in the range of 3–6% by weight.

18. The process according to claim 17 in which the water used to wash the first precipitate is acidic waste water.

19. The process according to claim 17 in which the water used to wash the first precipitate contains 0.5–1.0% by weight hydrofluosilicic acid.

20. The process according to claim 8 in which the water used to wash the first precipitate is hot water.

21. A process according to claim 16 in which about 100 parts by weight of a 5% calcium hydroxide solution formed by adding calcium oxide to water is added to about 1000 parts by weight of waste water having a pH of about 2, stirring the solution, whereby the first precipitate is formed, recovering said first precipitate, thereby leaving an aqueous residue; treating the aqueous residue with about 35 parts by weight of said calcium hydroxide solution per 1000 parts of said aqueous residue with stirring, until the pH reaches about 7 to form a second precipitate comprising mostly calcium phosphates; separating and recovering the thus formed second precipitate from the resulting aqueous residue, thereby to provide a purified final aqueous residue containing about 46 p.p.m. phosphate as $P_2O_5$ and about 3 p.p.m. fluoride, and washing said first precipitate with water until the $P_2O_5$ content of said first precipitate is in the range of 3–6% by weight; the initial analysis of the said starting waste water in weight percent being about 0.41 phosphate as $P_2O_5$, 0.33 fluoride, 0.05 calcium ions as CaO, and 0.09 silica.

22. The process according to claim 21 in which the water used to wash the first precipitate is acidic waste water.

23. The process according to claim 21 in which the water used to wash the first precipitate contains 0.5–1.0% by weight hydrofluosilicic acid.

24. The process according to claim 21 in which the water used to wash the first precipitate is hot water.

References Cited
UNITED STATES PATENTS

| | | | |
|---|---|---|---|
| 3,551,332 | 12/1970 | Baumann et al. | 210—53 |
| 3,493,340 | 2/1970 | Bosen et al. | 210—42 X |
| 2,780,521 | 2/1957 | Butt | 210—42 X |
| 3,398,088 | 8/1968 | Okey | 210—42 X |

SAMIH N. ZAHARNA, Primary Examiner

T. G. WYSE, Assistant Examiner

U.S. Cl. X.R.

210—53